United States Patent [19]

Matsuzaki et al.

[11] 4,401,309
[45] Aug. 30, 1983

[54] FUEL TANK FOR MOTORCYCLE

[76] Inventors: Kenji Matsuzaki, 888 Higashimisono, Hamakita-shi Shizuoka-ken; Akio Horino, 248 Haisaka Maisaka-cho, Hamana-gun, Shizuoka-ken; Yasuharu Terai, 80 Hatsugoshi Asaba-cho, Iwata-gun, Shizuoka-ken; Shohei Kato, 1627-3 Yutaka-cho, Hamamatsu-shi, Shizuoka-ken, all of Japan

[21] Appl. No.: 221,053

[22] Filed: Dec. 29, 1980

[30] Foreign Application Priority Data

Dec. 28, 1979 [JP] Japan .............................. 54-172878

[51] Int. Cl.³ .............................................. B62J 35/00
[52] U.S. Cl. ................................ 280/5 A; 220/5 A; 220/DIG. 29
[58] Field of Search .................. 280/5 R, 5 A–5 H; 105/360; 410/68; 220/5 A, DIG. 29; 29/421, 428

[56] References Cited

U.S. PATENT DOCUMENTS 2,330,940 10/1943 Wright ........................ 220/DIG. 29
3,473,687 10/1969 Larsen et al. ................. 280/5 A X
4,234,050 11/1980 Condon ........................ 280/5 R X

FOREIGN PATENT DOCUMENTS 52-54104 12/1977 Japan .
513275 10/1939 United Kingdom ............... 280/5

Primary Examiner—David M. Mitchell
Assistant Examiner—Mitchell J. Hill
Attorney, Agent, or Firm—Dnoald D. Mon

[57] ABSTRACT

A fuel tank for a motorcycle. The tank is made of an inner member and an outer member which form between them an inverted U-shaped space for containing fuel. The members are continuously joined to form the space by a welded seam. The members are joined at a seam which is located at both of their edges, except where an extension of one projects beyond the edge of the other to form a rear stay. The edge of said other member at the extension is welded directly to the extension, rather than to its edge. A rib can be formed integrally with the extension to reinforce it.

8 Claims, 5 Drawing Figures

FUEL TANK FOR MOTORCYCLE

FIELD OF THE INVENTION

The present invention relates to a fuel tank for a motorcycle, which is formed by welding an outer member and an inner member at their edges.

BACKGROUND OF THE INVENTION

A fuel tank for a motorcycle is required to be light and strong, to be leak proof, and to be easily produced. The fuel tank of this kind according to the prior art is constructed such that a mounting rear stay is welded to the back of an inner member or such that both outer and inner members are rearwardly extended to provide an extension acting as the rear stay. According to the former construction, however, there is a problem in strength and maintenance because the rear stay is welded in a cantilever construction to the inner member which is made of a relatively thin steel plate. The solution of this problem is accompanied by a disadvantage that the aforementioned intention to make the tank light has to be sacrificed. According to the latter construction, on the other hand, the above disadvantage can be eliminated, but there arise other disadvantages because it is difficult to register the outer and inner members at their rear stay portions and because the seam welding operation cannot be ensured due to the leakage of an electric current, i.e., ineffective shunt during the seam welding process.

BRIEF DESCRIPTION OF THE INVENTION

The present invention has been conceived in view of the circumstances thus far described and contemplates to provide a fuel tank for an autobicycle, in which one or both of outer and inner members is rearwardly extended to form a rear stay so that a strong and reliable joint inbetween can be achieved by this simple construction. The construction of the present invention will now be described in detail in connection with the embodiments thereof with reference to the accompanying drawings, in which:

DETAILED DESCRIPTION OF THE INVENTION

Figure 1:
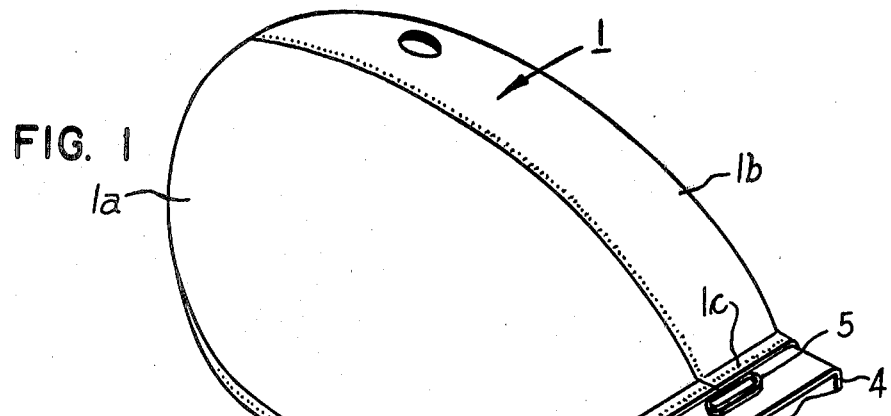
FIG. 1 is a perspective view showing a fuel tank according to the present invention.
Figure 2:
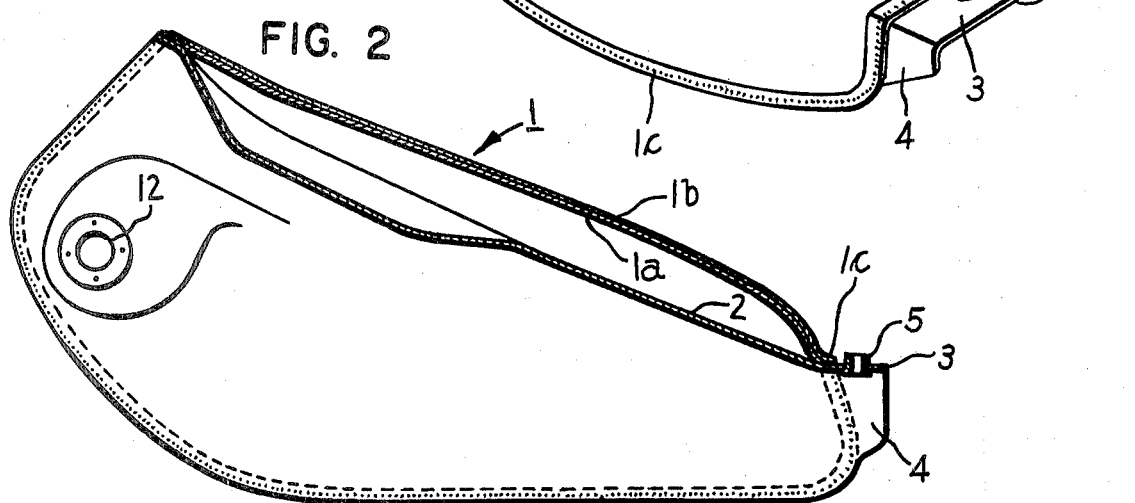
FIG. 2 is a longitudinal sectional side elevation of the same.
Figure 3:
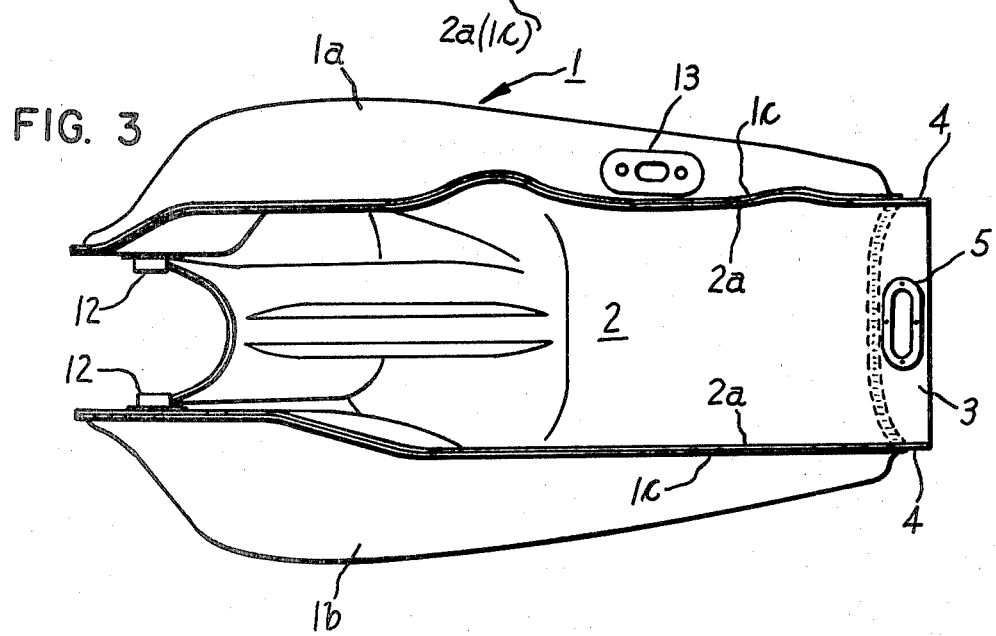
FIG. 3 is a bottom view.

FIGS. 1 to 4 show a fuel tank according to the present invention. An outer member 1 constitutes the outer wall of the fuel tank. This outer member 1 is constructed by seam welding a pair of its halves 1a and 1b at its widthwise center portion. Moreover, the outer member 1 is formed around its entire its circumferential edge with a flange 1c at which it is seam welded to an inner member, as will be described in the following. An inner member 2 constitutes the inner wall of the fuel tank. This inner member 2 is formed into an inverted U-shape composed of right and left side walls arranged in parallel and is seam welded at its edge portion 2a to the flange 1c of the outer member 1. Moreover, this inner member 2 is formed at its rear portion with a rear stay 3 which is integrally extended therefrom. More specifically, this inner member 2 is formed at its rear portion with the rear stay 3, which is extended in a flat shape from the upper wall portion of the inner wall, and a rib 4, which is extended from both the right and left side walls thereof, such that they protrude from the rear end of the outer member 1.

Figure 4:
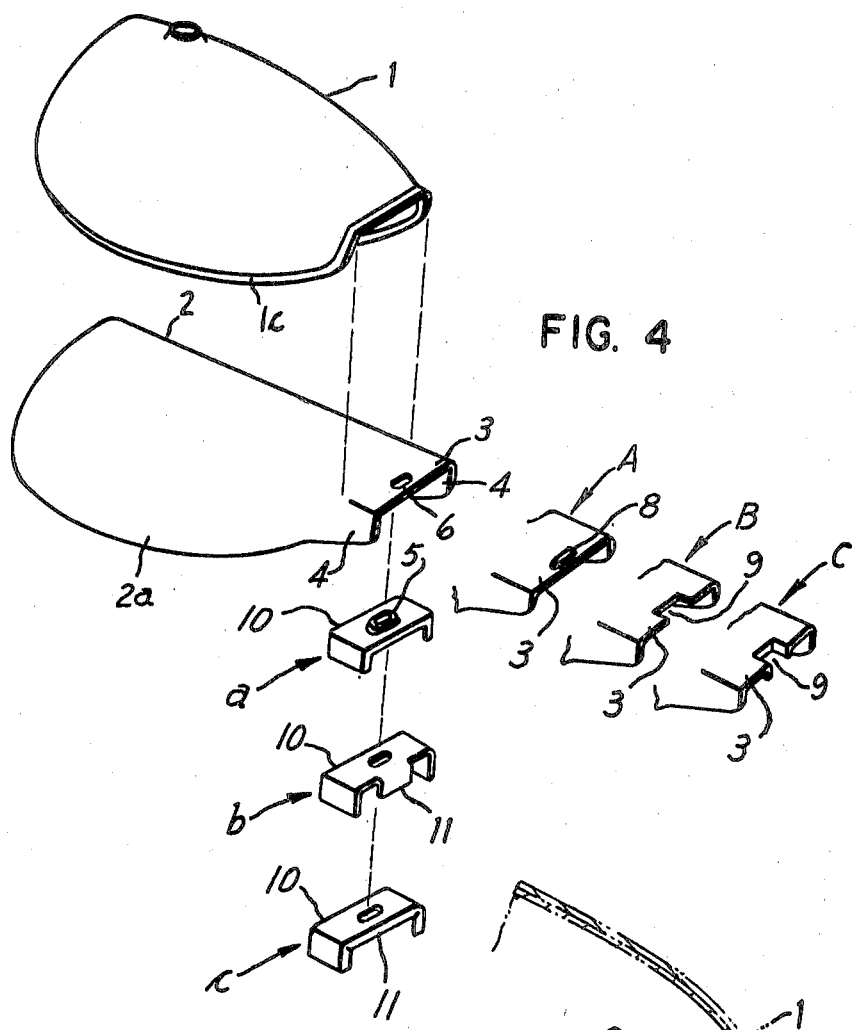
FIG. 4 is an exploded perspective view.

A holding member 5 is fitted in a slot 6 formed in the aforementioned rear stay 3 and is welded thereto at its flange portion. The holding member 5 thus welded is used to elastically mount the fuel tank on a frame through a not-shown shock absorber. Incidentally, either the holding member 5 or a slot 6 can be constructed in accordance with various embodiments, as shown in FIG. 4. In this Figure, reference letters A, B and C show the constructional examples of the slot 6, wherein: letter A indicates an example in which a holding member 8 integrally protrudes from the inner member 2; letter B indicates an example in which a notch is formed in the inner member 2; and letter C indicates an example in which the notch 9 in turn is formed with a reinforcing rib. On the other hand, reference letters a, b and c show a reinforcing member 10 for reinforcing the rear stay 3, wherein: letter a indicates an example in which the aforementioned holding member 5 integrally protrudes from the reinforcing member 10; and letters b and c indicate examples in which the reinforcing member 10 are formed with reinforcing ribs 11.

Incidentally, reference letter 12 indicates tank mounting members which support the fuel tank at the front portion thereof and which are spot welded to the inner wall surfaces of the inner member 2. Reference numeral 13 indicates a fuel cock mounting member. Moreover, these members 12 and 13 and the aforementioned holding member 5 reinforcing rib 10 are welded, respectively, prior to the joint between both the outer and inner members.

Figure 5:
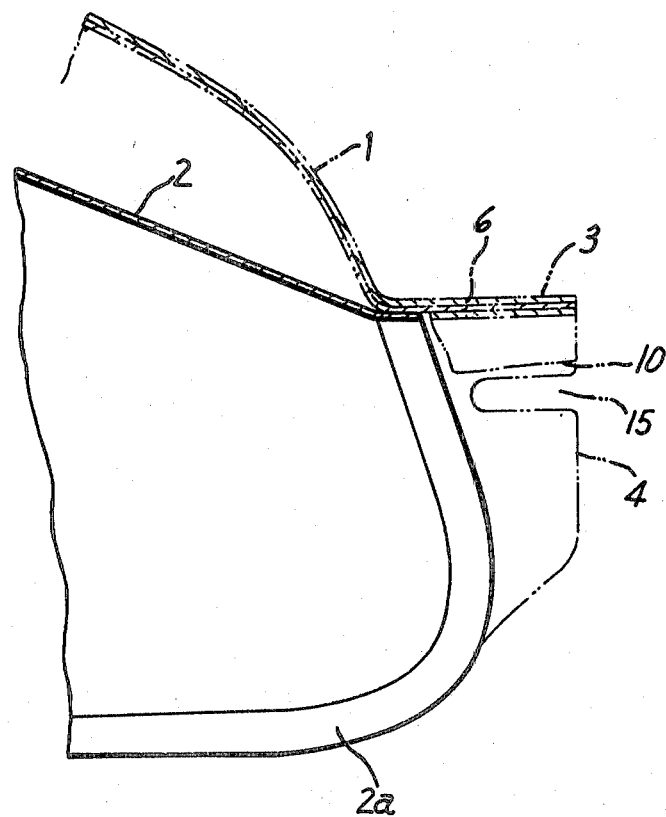
FIG. 5 is a longitudinal sectional side elevation showing the essential portion of another embodiment.

FIG. 5 is a longitudinal section showing the essential portion of another embodiment. The rear stay 3 is formed of the extension of the inner member 2 in the aforementioned example, whereas the rear stay 3 is formed of the outer member 1 in the embodiment to be described. As shown in FIG. 5, specifically, the rear flange of the outer member 1 is rearwardly extended together with the side walls thereof thereby to provide an extension which forms the rear stay 3 and its reinforcing rib 4. If the rear stay is formed in that way by the outer member, the inner member 2 has its rear cut surface covered with the outer member, thus inviting an advantage for maintaining a fine appearance. Incidentally, a notch, as indicated at reference numeral 15, is formed to bend the rear stay 3 at a preset angle after the seam welding process of the outer member 1 and the inner member 2. In other words, the elongation of the rib 4 is promoted during the bending process by the existence of that notch 15 so that the portion under consideration is prevented from being broken.

Although, in the embodiments of the present invention, the description is directed to a fuel tank in which the outer member 1 is formed of the paired outer member halves 1a and 1b, it is quite natural that the present invention can also be applied to the fuel tank in which the outer member is made of a single plate.

As has been described hereinbefore, according to the present invention, since one of the members has its joint portion cut short at the rear stay portion, no current leakage takes place during the seam welding process, thus ensuring the joint inbetween. Moreover, it is possible to provide a tank which is stronger than the fuel tank according to the prior art while requiring no registration. Still moreover, since the welding processes of the tank mounting members or the like can be performed prior to the jointing process of both the outer and inner members, an improvement in the operating efficiecy can be expected. Furthermore, if the rear stay is formed of the inner member as in the embodiment shown in FIGS. 1 to 4, all the tank mounting members are formed in the inner member, thus leading to an advantage that the mounting accuracy can be enhanced. On the contrary, if the rear stay is formed of the outer member, as shown in FIG. 5, the inner member has its edge covered with the outer member, thus leading to a different advantage in that a fine appearance can be maintained.

We claim:

1. In a tank of the type having an outer member and an inner member, said outer and inner members being U-shaped and joined at their edges to form a closed U-shaped fuel space, the improvement comprising a rearwardly extending portion of said outer member forming a flange, a rearwardly extending portion of said inner member forming a rear stay with an uppermost flat portion, said flange extending rearwardly for a lesser distance than said rear stay, said flange and said uppermost flat portion being continuously joined together, with a part of said rear stay extending rearwardly beyond said flange.

2. A tank according to claim 1 in which said rear stay includes at least one rib extending downward from said flat portion to reinforce said stay.

3. A tank according to claim 2 in which a plurality of said ribs is provided.

4. A tank according to claim 3 in which said flat portion stay forms an inverted U-shaped structure.

5. A tank according to claim 1 in which said stay has an aperture to receive a holding member by which the tank can be attached to a neighboring structure.

6. A tank according to claim 5 in which said rear stay includes at least one rib extending downward from said flat portion to reinforce said stay.

7. A tank according to claim 6 in which a plurality of said ribs is provided.

8. A tank according to claim 5 further including a holding member attached to said flat portion.

* * * * *